(12) United States Patent
Wu (10) Patent No.: US 8,268,190 B2
(45) Date of Patent: Sep. 18, 2012

(54) LIQUID CRYSTAL COMPOSITION FOR USE IN LIQUID CRYSTAL DISPLAY

(75) Inventor: Fuh-Tsang Wu, Tainan County (TW)

(73) Assignee: Chimei Innolux Corporation, Miao-Li County (TW)

( * ) Notice: Subject to any disclaimer, the term of this patent is extended or adjusted under 35 U.S.C. 154(b) by 0 days.

(21) Appl. No.: 12/618,391

(22) Filed: Nov. 13, 2009

(65) Prior Publication Data
US 2010/0124623 A1 May 20, 2010

(30) Foreign Application Priority Data

Nov. 14, 2008 (TW) .............................. 97144204 A (51) Int. Cl.
C09K 19/00 (2006.01)
C09K 19/02 (2006.01)
C09K 19/06 (2006.01)
C09K 19/52 (2006.01)

(52) U.S. Cl. ........... 252/299.01; 252/299.6; 252/299.62; 252/292.63; 428/1.1; 349/182; 349/187

(58) Field of Classification Search ............. 252/299.01, 252/299.6, 299.62, 299.63; 428/1.1; 430/20; 349/182, 187
See application file for complete search history.

(56) References Cited

U.S. PATENT DOCUMENTS 7,105,586 B2 * 9/2006 Verrall et al. .................. 428/1.3
2010/0320419 A1 * 12/2010 Irisawa et al. ............ 252/299.01

* cited by examiner

*Primary Examiner* — Geraldina Visconti
(74) *Attorney, Agent, or Firm* — Lowe Hauptman Ham & Berner LLP (57) ABSTRACT

A liquid crystal composition is disclosed, which includes a liquid crystal material having a negative dielectric constant anisotropy and at least two different kinds of reactive monomers. A proportion The amount of the at least two different kinds of the reactive monomers in the total weight of the liquid crystal composition is ranges from 0.05% to 10% by weight. Additionally, a liquid crystal display using the liquid crystal composition as well as methods and uses thereof are further provided.

9 Claims, 6 Drawing Sheets

LIQUID CRYSTAL COMPOSITION FOR USE IN LIQUID CRYSTAL DISPLAY

RELATED APPLICATIONS

The present application is based on, and claims priority from, Taiwan Application Serial Number 97144204, filed Nov. 14, 2008, the disclosure, drawings, and claims are hereby incorporated by reference herein in their entirety.

TECHNICAL FIELD OF THE INVENTION

This disclosure relates generally to a liquid crystal composition, and more particularly, to a liquid crystal composition for liquid crystal display, methods and uses thereof.

BACKGROUND OF THE INVENTION

A vertically-aligned (VA) liquid crystal display (LCD) is a mode of LCD using a negative liquid crystal material and a vertical alignment film. When no driving voltage is applied, liquid crystal molecules are aligned in a vertical direction and black display normally appears on the LCD. When a predetermined voltage is applied, the liquid crystal molecules are aligned in a horizontal direction and white display appears. In comparison with the twisted nematic (TN) LCD, the VA LCD provides higher contrast and higher response speed. However, there is still a critical disadvantage of a narrower viewing angle existed in the VA LCD, resulting in a problem of limited application of the VA LCD.

The viewing angle performance of the VA LCD can be improved by setting the orientation of the liquid crystal molecules inside pixels into a plurality of mutually different directions. A prior technology discloses a multi-domain vertically aligned (MVA) LCD having domain regulators for regulating the orientation of liquid crystal molecules, in which the liquid crystal molecules are aligned obliquely when a voltage is applied, so that the orientation of liquid crystal molecules may include a plurality of directions within each pixel. However, the voltage is applied in certain levels, the MVA LCD has slower response speed since the liquid crystal molecules requires more time to be aligned stably.

For the purpose of improving the above issues, a method of regulating alignment of the liquid crystal molecules during driving the liquid crystal molecules is provided. The liquid crystal material mixed with monomers is sealed between two substrates. Meanwhile, a voltage is applied to the substrates and a polymerization is carried out. When the applied voltage is removed, the liquid crystal molecules are tilted at a predetermined angle. Though the LCD has the higher response speed, it cannot provide an ideal image-sticking rate (α) about the credibility test. (Image-sticking is the phenomenon of visible retention of a previously displayed image in a screen, which can occur when a screen rewrite is performed. If the image-sticking rate is higher, the visible retention of the previously displayed image and the credibility of the LCD are worse.)

SUMMARY OF THE INVENTION

Accordingly, it is an aspect of some embodiments described herein to provide a novel liquid crystal composition, which makes it possible to decrease the image-sticking ratio of the resulted liquid crystal display, thereby effectively improving the credibility.

According to the aforementioned aspect of the present invention, a liquid crystal composition is provided. In some embodiments, the liquid crystal composition may include at least two different kinds of the reactive monomers and a liquid crystal material having a negative dielectric constant anisotropy. The amount of the reactive monomers in the liquid crystal composition ranges from 0.05% to 10% by weight.

In some embodiments, the liquid crystal composition may further include a photoinitiator, for example present in an amount less than 0.002% by weight of the total liquid crystal composition, so as to promote a subsequent polymerization.

In some embodiments, at least one of the at least two different kinds of the reactive monomers is selected from those of formula (I) and formula (II):

$$A1\text{-}M1\text{-}B1\text{-}M2\text{-}C1\text{-}B4 \quad (I)$$

$$A1\text{-}B1\text{-}M1\text{-}C1\text{-}B2\text{-}C2\text{-}B3\text{-}M2\text{-}A2 \quad (II)$$

in which the monomer of the formula (I) has a monofunctional reactive monomer, A1, the monomer of the formula (II) has a difunctional reactive monomer, A1 and A2, and the reminder of the variables are defined below.

In some embodiments, at least one of the two different kinds of the reactive monomers is selected from those of formula (I) and formula (II):

wherein A1 and A2 may be the same or different, and A1 and A2 may include, but are not be limited to, groups selected from acrylate, methyl acrylate, vinyl, vinyloxy, and epoxy groups;

in the formula (I) or the formula (II), B1 and B3 may be the same or different, and B1 and B3 are selected from 1,4-phenylene diphenyl naphthalene-2,6-diyl and phenoxy groups;

in the formula (II), B2 is selected from substituted and unsubstituted 1,4-phenylene groups, in an example, B2 is such as those selected from formula (III):

(III)

in which R₀ is selected from optionally substituted and unsubstituted alkyl groups having from 1 to 6 carbon atoms, optionally substituted and unsubstituted alkoxy groups having from 1 to 6 carbon atoms, halogen atoms, and alkenyl groups having from 1 to 6 carbon atoms; each of the alkyl and the alkoxy group may be interrupted by an unsaturated bond, an ether bond, a thioether bond and an ester bond (in some embodiments, e.g., the alkyl groups are unsubstituted and/or the alkoxy groups are unsubstituted);

in the formula (I), B4 is selected from a cholesteryl group phenyl-oxy-alkyl groups (in which R is selected from alkyl groups), and phenyl-cycloalkyl groups; (in some embodiments, e.g., the alkyl groups of the phenyl-oxy-alkyl groups have from 1 to 6 carbon atoms; and in some embodiments, e.g., the cycloalkyl groups of the phenyl-cycloalky groups have from 5 to 11 carbon atoms, and particularly those such as each cycloalkyl homolog from cyclohexyl through cyclodecanyl);

in the formula (I) or the formula (II), C1 and C2 may be the same or different, and C1 and C2 are selected from —COO—, —OCO—, and —O—; and in the formula (I) or the formula (II), M1 and M2 may be the same or different, and M1 and M2 are selected from alkanediyl groups and in which n is an integer ranging from 0 to 11.

In some embodiments, at least one of the at least two different kinds of the reactive monomers has a monofunctional reactive monomer (for example, the monomer of the formula (I)), and at least one of the at least two different kinds of the reactive monomers has a difunctional reactive monomer (for example, the monomer of the formula (II)).

In another embodiment of the present invention, at least two different kinds of the reactive monomers have difunctional reactive monomers (for example, the monomer of the formula (II)).

According to another aspect, some embodiments of the liquid crystal composition of the present invention are further applied to form a liquid crystal layer of a multi-domain vertically alignment (MVA) liquid crystal display. As a voltage is applied simultaneously, the at least two different kinds of the reactive monomers may be polymerized, and then a polymer network structure is formed on the two sides of the substrate. The polymer network structure may have a plurality of bulky side chains that include but are not limited to cholesteryl, phenyl-oxy-alkyl or phenyl-cycloalkyl side chains. Therefore, the bulky side chains of the polymer network structure facilitate aligning the liquid crystal molecules when there is no electric field applied to the liquid crystal layer. The amount of the monofunctional reactive monomer with the bulky side chains is less than 30% by weight of the reactive monomers. The amount of the monofunctional reactive monomer with the bulky side chains is within a range from 10% to 20% by weight of the reactive monomers.

In comparison with a liquid crystal display, which includes the liquid crystal material having only one kind of the reactive monomer, the liquid crystal display described herein, which includes the liquid crystal material including at least two different kinds of the reactive monomers, makes it possible to achieve a lower image-sticking rate, thereby effectively improving the credibility.

BRIEF DESCRIPTION OF THE DRAWINGS

The foregoing aspects and many of the attendant advantages of embodiments described herein will become more readily appreciated as the same becomes better understood by reference to the following detailed description, when taken in conjunction with the accompanying drawings, wherein.

DETAILED DESCRIPTION OF THE EXEMPLARY EMBODIMENTS

Although the present invention can be described by a variety of examples, the preferred embodiments and the accompanying drawings are described hereinafter. Although the invention has been described and disclosed in various terms and certain embodiments, the scope of the invention is not intended to be, nor should it be deemed to be, limited thereby and such other modifications or embodiments as may be suggested by the teachings herein are particularly reserved, especially as they fall within the breadth and scope of the claims here appended.

In some embodiments, the present invention provides a novel liquid crystal composition, which includes a liquid crystal material having a negative dielectric constant anisotropy and at least two different kinds of the reactive monomers. When the liquid crystal material having a negative dielectric constant anisotropy is sealed between two vertically-aligned substrates, the liquid crystal layer contains liquid crystal molecules that are substantially vertical to a surface of the substrates when there is no electric field applied to the liquid crystal layer.

In some embodiments, the amount of the reactive monomers in the total weight of the liquid crystal composition is from 0.05% to 10% by weight. When the liquid crystal molecules are driven, the liquid crystal molecules are less stable, less reproducible, and harder to be aligned by the polymer if the polymer is formed by less than 0.05% by weight of the reactive monomers in the liquid crystal composition. However, the operation voltage is higher than preferred (due to the stronger anchoring force existed in the liquid crystal molecules and the polymer) if the polymer is formed by more than 10% by weight of the reactive monomers in the liquid crystal composition.

In some embodiments of the present invention, the liquid crystal composition further includes a photoinitiator for example, having less than 0.002% by weight in the total liquid crystal composition, so as to promote a subsequent polymerization. Any photoinitiator irradiated to generate free radicals may be used. Suitable photoinitiators that are normally used in combination with a He—Cd laser (as a radiation source) are acetophenones.

In some embodiments of the present invention, at least one of the at least two different kinds of the reactive monomers is selected from those of formula (I) and formula (II):

A1-M1-B1-M2-C1-B4        (I)

A1-B1-M1-C1-B2-C2-B3-M2-A2        (II)

wherein the monomer of the formula (I) has a monofunctional reactive monomer, A1, the monomer of the formula (II) has a difunctional reactive monomer, A1 and A2, and the remaining variables are defined below.

In some embodiments, at least one of the at least two different kinds of the reactive monomers is selected from those of formula (I) and formula (II):

wherein A1 and A2 are may be the same or different, and A1 and A2 may include, but not be limited to, groups selected from acrylate, methyl acrylate, vinyl, vinyloxy, and epoxy groups;

in the formula (I) or the formula (II), B1 and B3 may be the same or different, and B1 and B2 are selected from 1,4-phenylene

, diphenyl

, naphthalene-2,6-diyl

, and phenoxy groups;

in the formula (II), B2 is selected from substituted and unsubstituted 1,4-phenylene groups, in an example, B2 is such as those having a structure of formula (III):

in which $R_O$ is selected from optionally substituted and unsubstituted alkyl groups having from 1 to 6 carbon atoms, optionally substituted and unsubstituted alkoxy groups having from 1 to 6 carbon atoms, halogen atoms, and alkenyl groups having from 1 to 6 carbon atoms; each of the alkyl and the alkoxy group may be interrupted by an unsaturated bond, an ether bond, a thioether bond and an ester bond (in some embodiments, e.g., the alkyl groups are unsubstituted and/or the alkoxy groups are unsubstituted);

in the formula (I), B4 is selected from a cholesteryl group phenyl-oxy-alkyl groups (R is selected from alkyl groups), and phenyl-cycloalkyl groups (in some embodiments, e.g., the alkyl groups of the phenyl-oxy-alkyl groups have from 1 to 6 carbon atoms; and in some embodiments, e.g., the cycloalkyl groups of the phenyl-cycloalky groups have from 5 to 11 carbon atoms, and particularly those such as each cycloalkyl homolog from cyclohexyl through cyclodecanyl);

in the formula (I) or the formula (II), C1 and C2 may be the same or different, and C1 and C2 are selected from —COO—, —OCO—, and —O—; and in the formula (I) or the formula (II), M1 and M2 may be the same or different, and M1 and M2 are selected from alkanediyl groups

, and in which n is an integer ranging from 0 to 11.

In some embodiments of the present invention, at least one of the at least two different kinds of the reactive monomers has a monofunctional reactive monomer (for example, the monomer of the formula (I)), and at least one of the at least two different kinds of the reactive monomers has a difunctional reactive monomer (for example, the monomer of the formula (II)).

In some embodiments of the present invention, at least two different kinds of the reactive monomers have difunctional reactive monomers (for example, the monomer of the formula (II)).

Some of the at least two different kinds of reactive monomers having formula (I) or the formula (II) or other are listed in the below, but they are not intended to be, nor should they be deemed to be, limited thereby and such other modification or embodiments as may be suggested by the compounds herein.

PLC-7199 in which R is selected from alkyl-$C_mH_{2m+1}$, and n is an integer ranging from 0 to 11, and m is an integer ranging from 0 to 11.

PLC-7238 in which X denotes a alkanediyl linking group of

$-(CH_2)_n-$, and n is an integer ranging from 0 to 11, for example.

PLC-7212 in which $R_1$ is selected from alkyl-$C_mH_{2m+1}$, and n is an integer ranging from 0 to 11, and m is an integer ranging from 0 to 11. (As shown, the structure PLC-7212 is one in which $R_1$ bisects the 2,3- or 5,6-bond of the phenylene group.) In one example (PLC-7212), $R_1$ group is in the 2-position of the 1,4-phenylene group, in another example, $R_1$ could be any other position.

PLC-7223 in which $R_2$ is selected from alkyl-$C_mH_{2m+1}$, and n is an integer ranging from 0 to 11, and m is an integer ranging from 0 to 11. (As shown, the structure PLC-7223 is one in which $R_2$ bisects the 2,3- or 5,6-bond of the phenylene group.) In one example (PLC-7223), $R_2$ group is in the 2-position of the 1,4-phenylene group, in another example, $R_2$ could be any other position.

PLC-7257 in which $R_3$ is selected from alkyl-$C_mH_{2m+1}$, and n is an integer ranging from 0 to 11, and m is an integer ranging from 0 to 11. (As shown, the structure PLC-7257 is one in which $R_3$ bisects the 2,3- or 5,6-bond of the phenylene group.) In one example (PLC-7257), $R_3$ group is in the 2-position of the 1,4-phenylene group, in another example, $R_3$ could be any other position.

PLC-7240 in which $R_4$ is selected from alkoxy-$OC_mH_{2m+1}$, each Y may be the same or different, and each Y is selected from alkyl-$C_pH_{2p}$, m is an integer ranging from 0 to 11, and p is an integer ranging from 0 to 11; A and B may be the same or different, and A and B are selected from cycloalkyl groups having from 5 to 11 carbon atoms (for example, each cycloalkyl homolog from cyclohexyl through cyclodecanyl).

The monomers of Formulas (I) and (II), as well as PLC-7199, PLC-7238, PLC-7212, PLC-7223, PLC-7257, & PLC-7240 are provided by ADEKA Corporation or readily prepared from readily available compounds.

In some embodiments, the liquid crystal composition of the present invention may be further used to form a liquid crystal layer of a multi-domain vertically alignment (MVA) liquid crystal display. The MVA liquid crystal display formed from some embodiments of the liquid crystal composition of the present invention makes it possible to achieve a lower image-sticking rate, thereby effectively improving the credibility.

Figure 1:
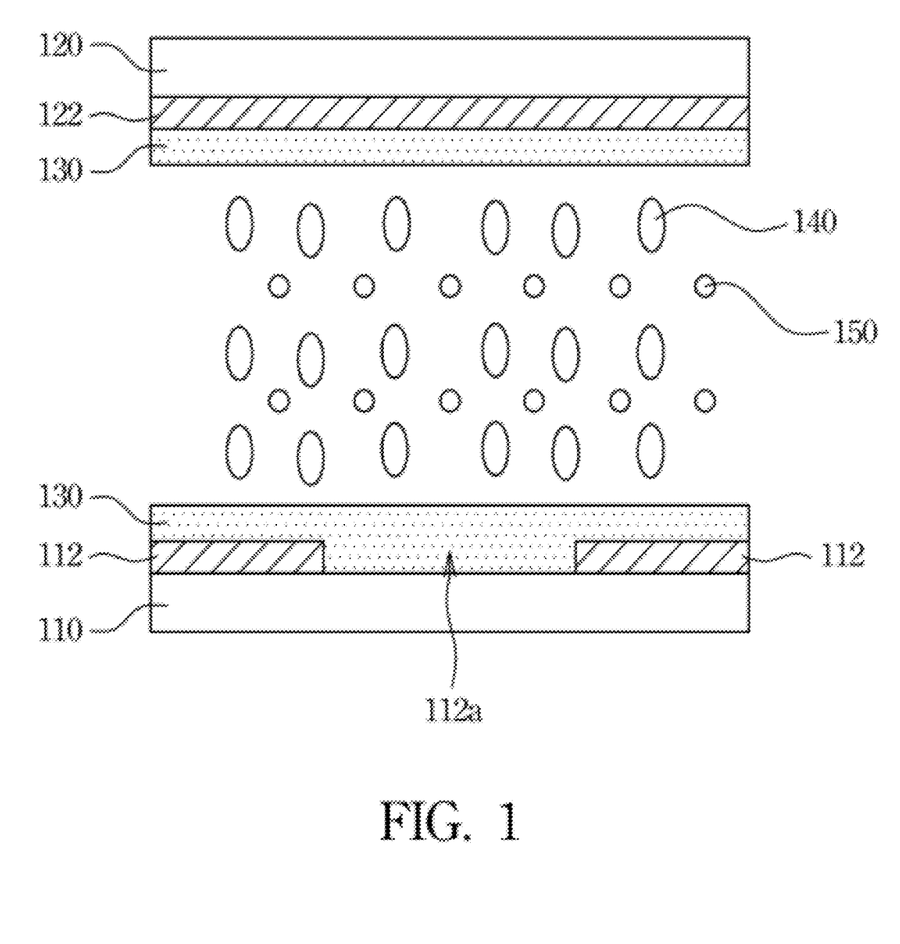
FIGS. 1 to 4 depict cross-sectional diagrams of a MVA liquid crystal display according to an embodiment of some embodiments described herein during various steps of the process.

Reference is made to FIG. 1, which depicts a MVA liquid crystal display according to some embodiments of the present invention. The MVA liquid crystal display includes a first substrate 110 and a second substrate 120. In addition to the first substrate 110 and the second substrate 120, polarizing plates (unshown) may be further disposed on the first substrate 110 and the second substrate 120, respectively, for polarizing the light. A backlight source, for example, a backlight module, may be disposed in back of the first substrate 110.

Reference is made to FIG. 1 again. The MVA liquid crystal display, in some embodiments of the present invention, may be a thin-film transistor-liquid crystal display (TFT-LCD). The first substrate 110 has a plurality of gate lines and data lines (unshown) arranged in array disposed thereon. The gate lines are typically arranged in parallel to each other, and the gate lines are vertical to the data lines. A plurality of the thin-film transistors (unshown) and the pixel electrode 112 are arranged in array near the intersections of the gate lines and data lines. The first substrate further has auxiliary capacitor lines (unshown) configured thereon independently and in parallel to the gate lines. The second substrate 120 can have a light-shielding array (for example, a black matrix (BM) (unshown)), a plurality of color filter layer (unshown) and a common electrode 122. In some embodiments, the first substrate 110 denotes a thin-film transistor (TFT) substrate, and the second substrate 120 denotes a color filter (CF) substrate. A spacer (unshown) may be disposed between the first substrate 110 and the second substrate 120, so as to define the space between the first substrate 110 and the second substrate 120. In the embodiment of FIG. 1, a slit 112a is disposed in the pixel electrode 112 and served as a domain regulator. When a voltage is applied to the liquid crystal layer, the slit 112a regulates the orientation of the liquid crystal molecules 140 in the liquid crystal layer, for tilting and aligning the liquid crystal molecules 140 at variable directions, thereby appearing a wide view angle performance of the resulted liquid crystal display. In some embodiments, for example, a vertical aligned film 130, is applied to the surfaces of the first substrate 110 and the second substrate 120.

Reference is made to FIG. 1 again. The first substrate 110 and the second substrate 120 are combined together, and the liquid crystal composition (including liquid crystal molecules 140 in FIG. 1) and at least two different kinds of reactive monomers 150 are sealed between the first substrate 110 and the second substrate 120, so as to form the liquid crystal layer. In detail, the first substrate 110 and the second substrate 120 are aligned to each other, separated by about 4 millimeters, and then bonded to each other with epoxy resin along the outer edge. Next, the bonded substrates and a container filled with the liquid crystal composition are put into a vacuum chamber so that the space between the bonded substrates is lowered in pressure. Afterwards, a fill port of the bonded substrates faces the container and contacts with the liquid crystal composition. And then, the vacuum is broken, and there is a pressure difference between the outside and inside of the bonded substrates generate, so that the liquid crystal composition is slowly sucked by the capillary force from the fill port transported into the space between the bonded substrates. Additionally, other quick-fill technologies developed currently, for example, one-drop fill technology, are also adopted herein. In the one-drop fill technology, at least one drop of the liquid crystal composition has been filled into the space between the bonded substrates before the substrates are bonded.

Figure 2:
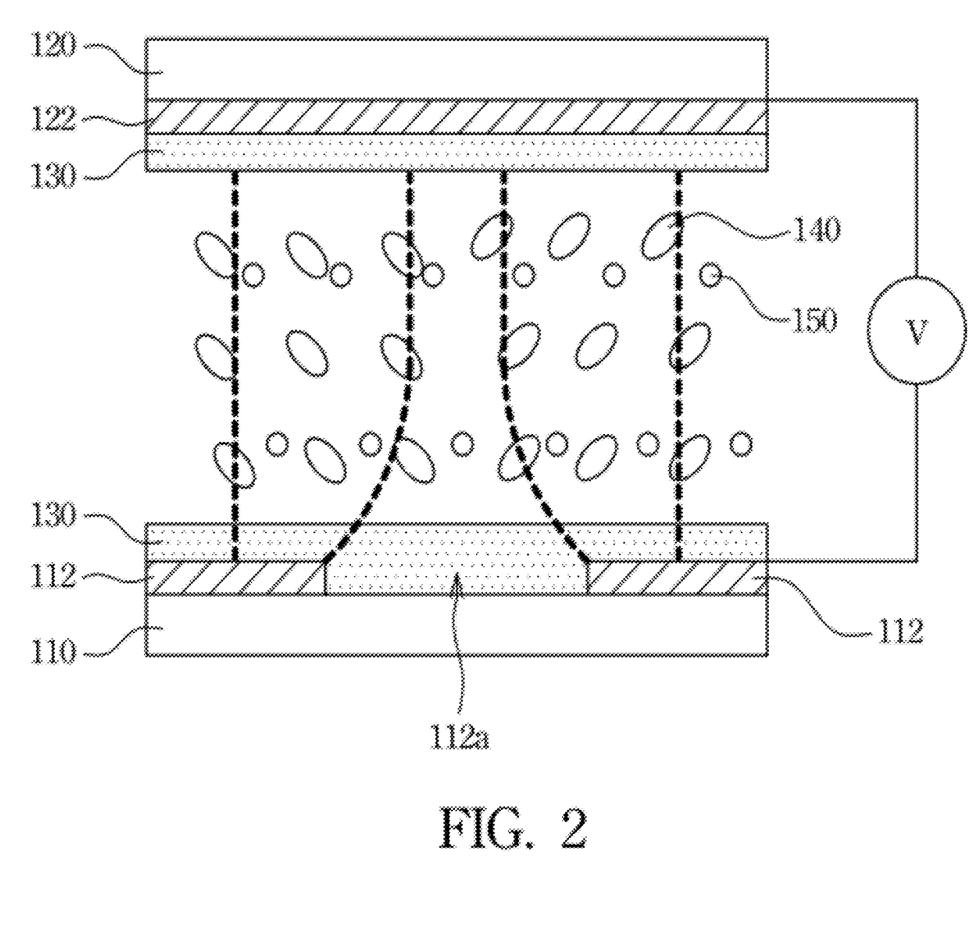

As shown in FIG. 1, when substantially no voltage is applied substantially, the liquid crystal molecules 140 are substantially vertical to a surface of the first substrate 110 and the second substrate 120. When a predetermined voltage is applied as shown in FIG. 2, an electric field generates near the slit 112a (the electrode edge) of the pixel electrode 112, and the electric field (as the bold dashed lines shown in the FIG. 2) is tilted to the substrate surfaces. The tilted electric field generated between the substrates determines the tilted direction of the liquid crystal molecules 140 at that place. In FIG. 2, the orientation of the liquid crystal molecules 140 is divided into two different directions.

Figure 3:
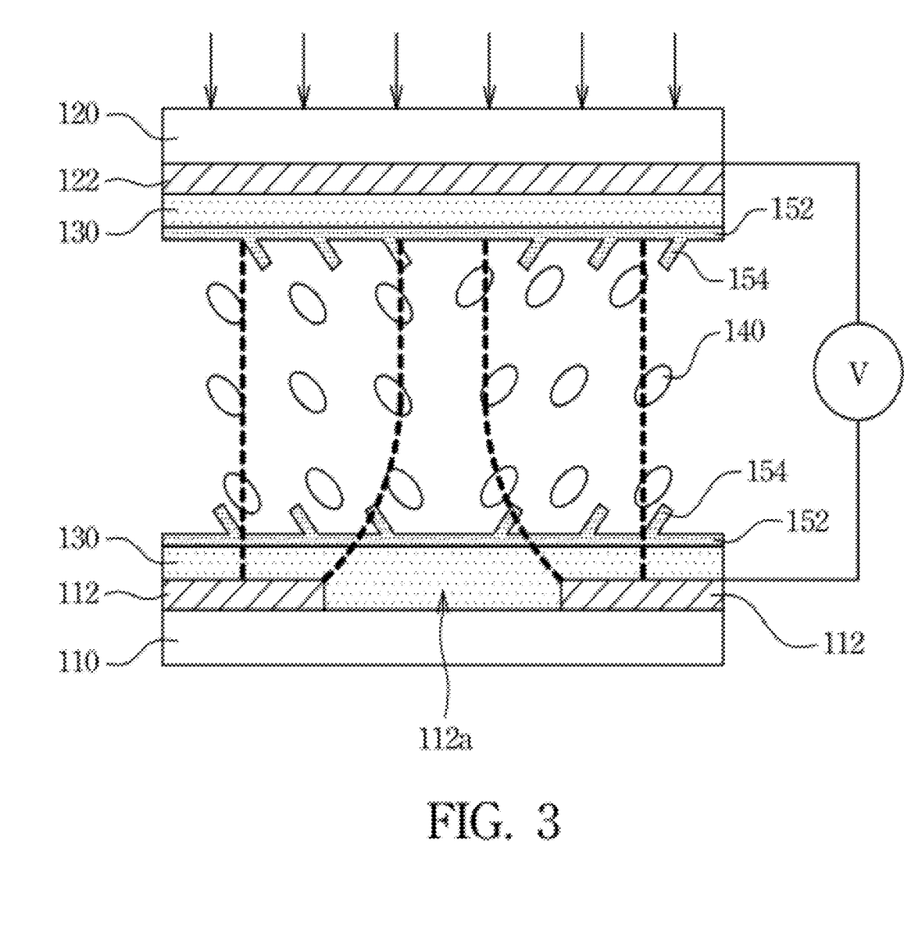

While the applied voltage is kept in the predetermined level, an ultraviolet light (as arrows shown in FIG. 3) irradiates the liquid crystal layer intervened between the first substrate 110 and the second substrate 120. A high-pressure mercury lamp or a He—Cd laser (unshown) may generate the ultraviolet light. As shown in FIG. 3, the at least two different kinds of reactive monomers 150 existed two reactive monomers are polymerized to a polymer network structure (for example, an acrylate polymer network structure) 152 formed on the surfaces of a vertical aligned film 130. The polymer network structure 152 may have a plurality of bulky side chains 154 that include but are not limited to cholesteryl, phenyl-oxy-alkyl or phenyl-cycloalkyl side chains.

Figure 4:
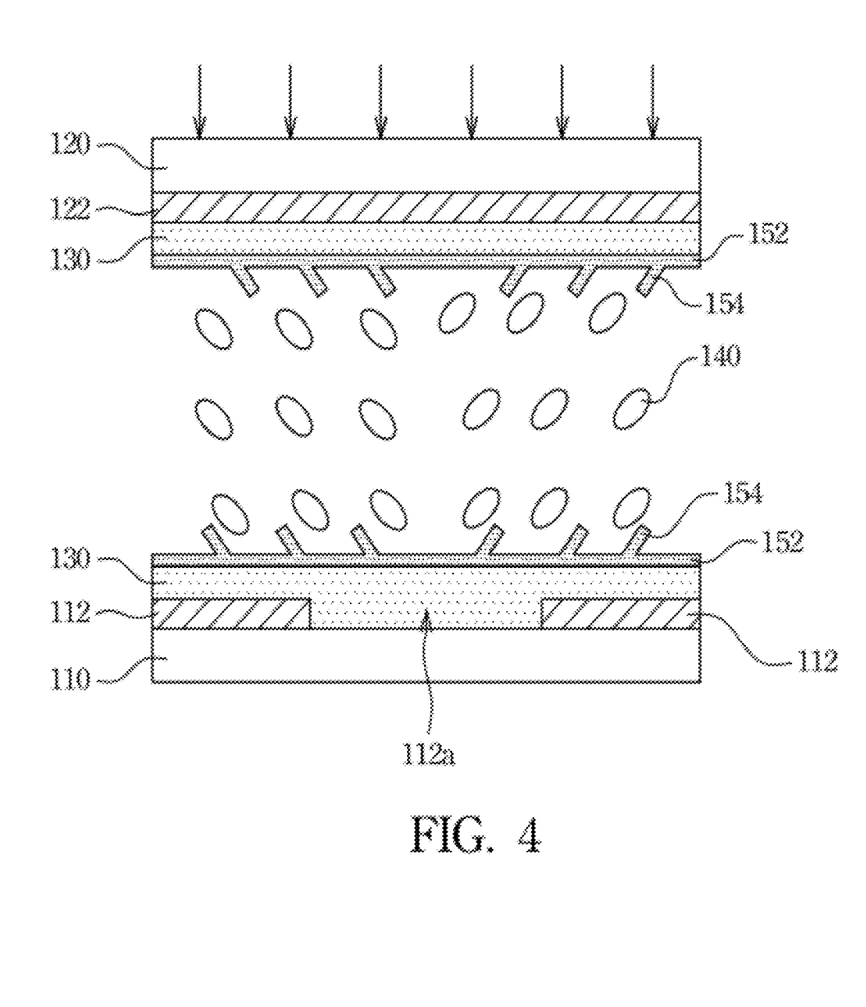

Therefore, the bulky side chains 154 of the aforementioned polymer network structure 152 align the liquid crystal molecules 140 adjacent to the substrate surfaces when there is no electric field applied to the liquid crystal layer. The pre-tilted angle and alignment of the liquid crystal molecules 140 between the substrates are stabilized according to the continuous elasticity theory. For example, in FIG. 4, the liquid crystal molecules 140 are divided into two different directions, thereby appearing a wide view angle performance of the resulted liquid crystal display.

Figure 5:
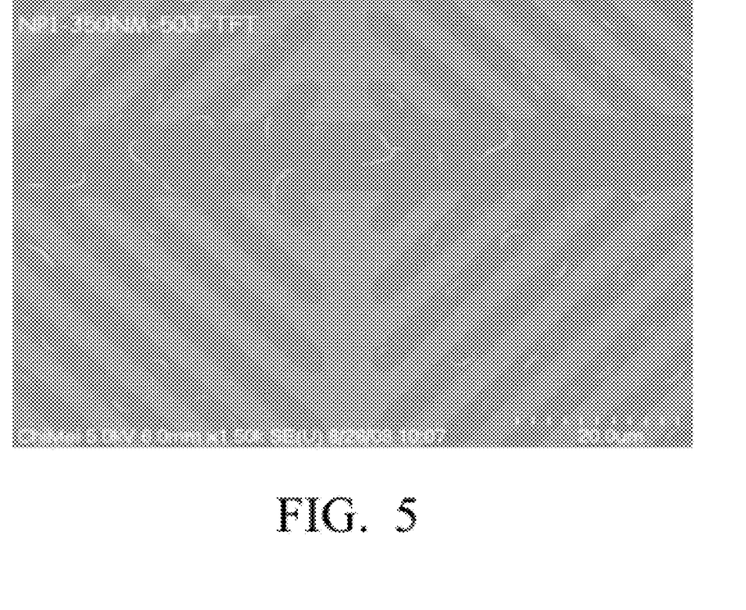
FIGS. 5 and 6 are scanning electron microscope (SEM) photos of the polymer network structure on the substrate of the liquid crystal display according to several embodiments of some embodiments described herein.
Figure 6:
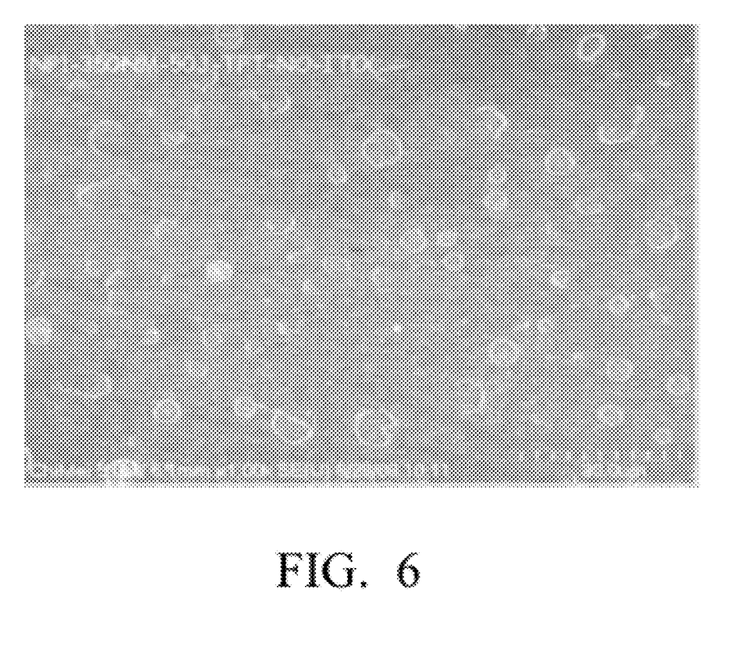

Reference is made to FIGS. 5 and 6, which are scanning electron microscope (SEM) photos of the polymer network structure on the substrate of the liquid crystal display according to several embodiments of the present invention. It is worth mentioning that, the ultraviolet irradiation can facilitate the monomers to react and form the polymer network structure with polymeric protrusions (as shown in FIGS. 5 and 6). As shown in FIGS. 5 and 6, the polymeric protrusions may have geometrical shapes, for example, lines, spheres or other shapes depending on various processes.

In some embodiments, provided is a liquid crystal display, comprising:
a first substrate and a second substrate, wherein the first substrate and the second substrate are vertically-aligned; a liquid crystal layer described herein is intervened between the first substrate and the second substrate, wherein the liquid crystal layer contains liquid crystal molecules that are substantially vertical to a main surface of the first substrate when no electric field is applied to the liquid crystal layer; and a polymer polymerized by at least two different kinds of reactive monomers described herein disposed on the first substrate and the second substrate respectively.

In some embodiments, provided is a method comprising introducing a liquid crystal composition described herein between a first substrate and a second substrate, optionally wherein the first substrate and the second substrate are vertically-aligned; and applying an (optionally tilted) electric field to polymerize the at least two different kinds of reactive monomers. Thereinafter, the following examples are merely illustrative and are not intended to limit the invention rather than limiting other portions of the present disclosure in whatever conditions. Even without further illustration, a skilled artisan can utilize the present invention completely according to the description herein.

Comparative Example

Manufacture of Liquid Crystal Display Using Only One Kind of The Reactive Monomer The COMPARATIVE EXAMPLE shows the manufacture of a liquid crystal display made using only one kind of the reactive monomer. Each of the reactive monomers listed in TABLE 1 was mixed with a commercial liquid crystal material, such as MJ0961213, which was sold by Merck Chemical and the a commercial photoinitiator, such as K01, which was sold by ADEKA Corporation, so as to obtain a liquid crystal composition (containing 0.3% by weight of the reactive monomer and 60 ppm of the photoinitiator). Next, the liquid crystal composition was sealed between two glass substrates both of which had vertical alignment films configured thereon respectively. Then, a voltage was applied to the substrates and a polymerization was carried out. The resultant liquid crystal display was subjected to a credibility test (under 50 degree C., 12 V and 60 Hz for 120 hours), and the measured image-sticking rate ($\alpha$) was calculated by the below equation (1) and listed in TABLE 1.

$$\text{Image-sticking rate } (\alpha)=(\beta-\gamma)/\gamma*100\% \qquad (1)$$

The image-sticking rate ($\alpha$) was determined as follows. A black-and-white checker pattern was displayed on a display area of an LCD for a long time. Then, a predetermined half-tone was displayed throughout the display area; a difference ($\beta-\gamma$) between luminance $\beta$ of regions where white has been displayed and luminance $\gamma$ of regions where black has been displayed were identified; and the luminance difference ($\beta-\gamma$) was divided by the luminance $\gamma$ of the regions where black has been displayed to determine the image-sticking rate ($\alpha$). If $\alpha$ is smaller, the difference of ($\beta-\gamma$) is also smaller and the credibility is better.

TABLE 1

| COMPARATIVE EXAMPLE | Reactive Monomer | a |
|---|---|---|
| 1 | PLC-7223 (n = 6, m = 3) | 4.12 |
| 2 | PLC-7240 (p = 1, m = 3, A & B are cyclohexyl and $R_4$ is in the para-position) | 35.20 |
| 3 | PLC-7223 (n = 3, m = 3) | 2.25 |
| 4 | PLC-7257 (n = 6, m = 3) | 1.86 |
| 5 | PLC-7257 (n = 3, m = 3) | 1.63 |
| 6 | PLC-7212 (n = 6, m = 3) | 1.98 |
| 7 | PLC-7238 (n = 2) | 4.40 |
| 8 | PLC-7199 (n = 2, m = 1) | 6.59 |

Example

Manufacture of Liquid Crystal Display Using at Least Two Different Kinds of Reactive Monomers The EXAMPLE shows the manufacture of a liquid crystal display made using at least two different kinds of reactive monomers. The combinations of reactive monomers listed in TABLE 2 were mixed with a commercial liquid crystal material, such as MJ0961213, which was sold by Merck Chemical and a commercial photoinitiator, such as K01, which was sold by ADEKA Corporation, so as to obtain a liquid crystal composition (containing 0.3% by weight of the reactive monomers and 60 ppm of the photoinitiator). Next, the liquid crystal composition was sealed between two glass substrates both of which have vertical alignment films configured thereon respectively. Then, a voltage was applied to the substrates and a polymerization was carried out. The resultant liquid crystal display was subjected to a credibility test (under 50 degree C., 12 V and 60 Hz for 120 hours), and the measured image-sticking rate ($\alpha$) was calculated by the equation (1) and listed in TABLE 2.

TABLE 2

| EXAMPLE | Combinations of Reactive Monomers | a |
|---|---|---|
| 1 | PLC-7223 (n = 6, m = 3) + PLC-7238 (n = 2) (9:1) | 1.39 |
| 2 | PLC-7223 (n = 6, m = 3) + PLC-7238 (n = 2) (8:2) | 0 |
| 3 | PLC-7223 (n = 6, m = 3) + PLC-7199 (n = 2, m = 1) (9:1) | 1.73 |
| 4 | PLC-7223 (n = 6, m = 3) + PLC-7199 (n = 2, m = 1) (8:2) | 3.16 |
| 5 | PLC-7223 (n = 6, m = 3) + PLC-7199 (n = 2, m = 1) (7:3) | 3.83 |
| 6 | PLC-7240 (p = 1, m = 3, A & B are cyclohexyl and $R_4$ is in the para-position) + PLC-7223 (n = 6, m = 3) (5:5) | 3.83 |
| 7 | PLC-7240 (p = 1, m = 3, A & B are cyclohexyl and $R_4$ is in the para-position) + PLC-7223 (n = 6, m = 3) (2:8) | 1.58 |
| 8 | PLC-7240 (p = 1, m = 3, A & B are cyclohexyl and $R_4$ is in the para-position) + PLC-7257 (n = 6, m = 3) + PLC-7257 (n = 3, m = 3) (0.5:2:0.5) | 1.32 |
| 9 | PLC-7238 (n = 2) + PLC-7257 (n = 6, m = 3) + PLC-7257 (n = 3, m = 3) (8:72:18) | −0.32 |

The liquid crystal compositions of EXAMPLES 1 and 2 in TABLE 2 contain the reactive monomer of the formula (I) (i.e., PLC-7238) and the reactive monomer of the formula (II) (i.e., PLC-7223) present in the amount given by the ratios between the parenthesis. The liquid crystal display made using at least two different kinds of reactive monomers of EXAMPLES 1 and 2 have measured image-sticking rates that are lower than those of using only one kind of the reactive monomer of COMPARATIVE EXAMPLES 1 (using PLC-7223 only) and 7 (using PLC-7238 only). According to the above results, the polymer network structure formed by adding the reactive monomer with bulky side chains (for example, PLC-7238) can further stabilize the alignment of the liquid crystal molecules and provide better credibility, when compared to the polymer network structure formed by the reactive monomer with long carbon chains alone (for example, PLC-7223). The amount of the monofunctional reactive monomer with the bulky side chains is less than 30% by weight of the reactive monomers. The amount of the monofunctional reactive monomer with the bulky side chains is within a range from 10% to 20% by weight of the reactive monomers.

The liquid crystal compositions of EXAMPLES 3 to 5 in TABLE 2 contain the reactive monomer of the formula (I) (i.e., PLC-7199) and the reactive monomer of the formula (II) (i.e., PLC-7223). The liquid crystal display made using at least two different kinds of reactive monomers of EXAMPLES 3 to 5 have measured image-sticking rates that are lower than those of using only one kind of the reactive monomer of COMPARATIVE EXAMPLES 1 (using PLC-7223 only) or and 8 (using PLC-7199 only). In comparison with EXAMPLES 1 and 2, the polymer network structure formed by the reactive monomer with side chains of pseudo-liquid crystal molecules of EXAMPLES 3 to 5 may have better affinity with other liquid crystal molecules, for further stabilizing the alignment of the liquid crystal molecules and providing better credibility.

The liquid crystal compositions of EXAMPLES 6 and 7 in TABLE 2 contain two different reactive monomers of the formula PLC-7223 and PLC-7240. The liquid crystal display made using the two different kinds of reactive monomers of EXAMPLES 6 and 7 have measured image-sticking rates that are lower than those of using only one kind of the reactive monomer of COMPARATIVE EXAMPLES 1 (using PLC-7223 only) or and 2 (using PLC-7240 only). According to the above results, the polymer network structure with bulky side chains that are similar to EXAMPLES 1 and 2 can provide better credibility.

The liquid crystal compositions of EXAMPLES 8 and 9 in TABLE 2 contain three different reactive monomers of the formula PLC-7240, PLC-7257 (n=6), and PLC-7257 (n=3). The liquid crystal display using the three different kinds of reactive monomers of EXAMPLES 8 and 9 have measured image-sticking rates that are lower than those of using only one kind of the reactive monomer of COMPARATIVE EXAMPLES 2 (using PLC-7240 only), 4 (using PLC-7257 (n=6) only), and 5 (using PLC-7257 (n=3) only).

Figure 7:
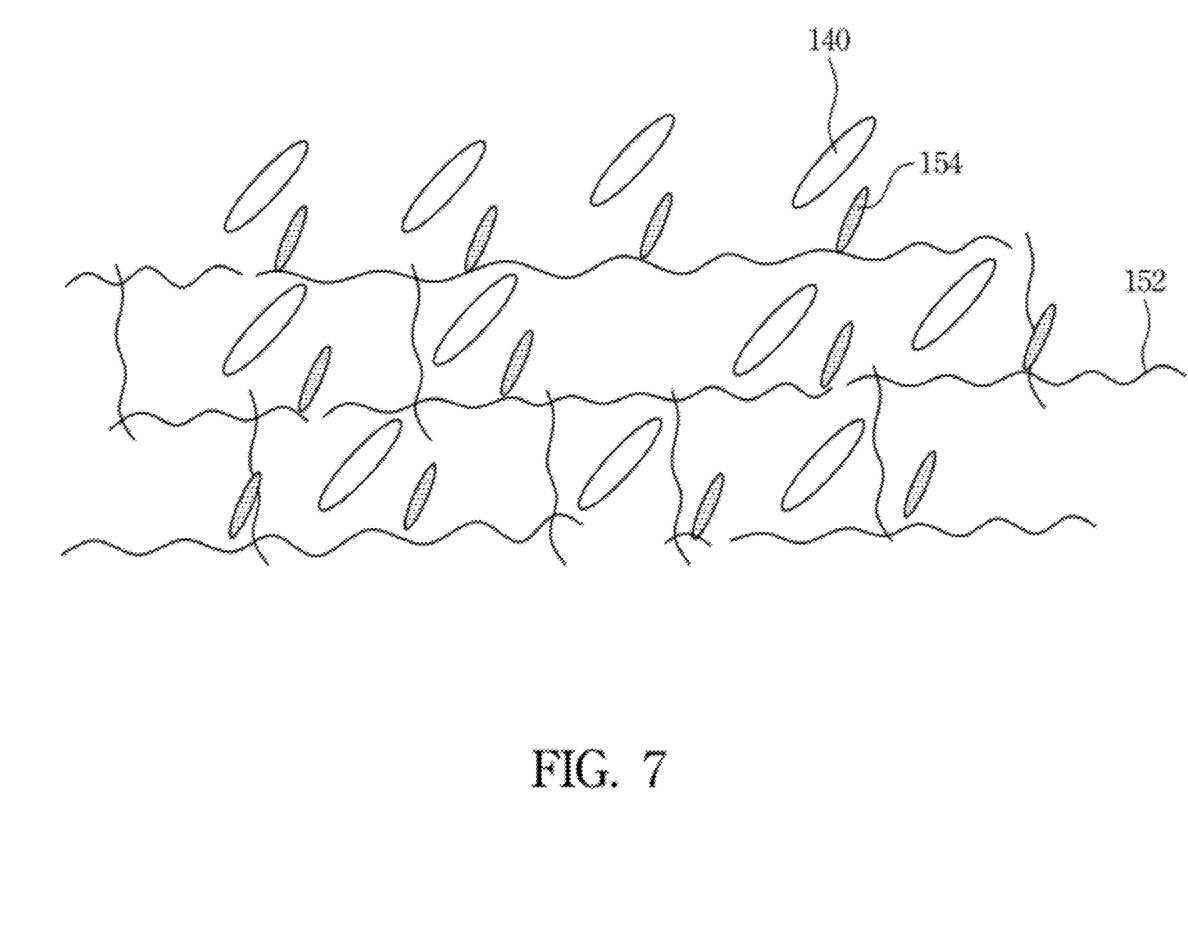
FIG. 7 depicts a diagram of the liquid crystal layer according to an embodiment of some embodiments described herein.

Refer to FIG. 7, that is a diagram of the liquid crystal layer, according to some embodiments of the present invention, includes a polymer network structure 152 that has various mesh sizes formed by the reactive monomers with bulky side chains 154 (for example, PLC-7238) or formed by the reactive monomers with various alkylene chain lengths (e.g., varying n of M1 and M2 of the formulas (I) or (II) is an integer from 0 to 11). Moreover, the mesh size of the polymer network structure 152 can be adjusted by the monomers with the bulky side chains or the various alkylene chain lengths for further stabilizing the alignment of the liquid crystal molecules 140 and providing better credibility, when compared to the mesh size of a polymer network structure formed by the reactive monomer with long carbon chains (for example, PLC-7257) alone. The amount of the monofunctional reactive monomer with the bulky side chains is less than 30% by weight of the reactive monomers. The amount of the monofunctional reactive monomer with the bulky side chains is within a range from 10% to 20% by weight of the reactive monomers.

Besides, according to FIG. 7, it is readily reasoned that the polymer network structure 152 (for example, the acrylate polymer network structure) may be formed by monofunctional reactive monomers of the formula (I), difunctional reactive monomers of the formula (II) or any combinations thereof. As an example of some embodiments, a base portion of the polymer network structure 152 may be provided by the difunctional reactive monomers of the formula (II). The bulky side chains 154 of the polymer network structure 152 may be provided by the monofunctional reactive monomers of the formula (I). In the above embodiments, for the purposes of achieving a level of stability in the polymer network structure of the liquid crystal layer, the difunctional reactive monomers of the formula (II) can accommodate the reactive monomers with various alkylene chain lengths (e.g., varying n of M1 and M2 of the formula (II) is an integer from 0 to 11), so as to adjust the mesh size of the polymer network structure 152.

However, in other examples of embodiments, the polymer network structure may be formed by monofunctional reactive monomers of the formula (I) and difunctional reactive monomers of the formula (II). In this example of embodiments, for the purposes of achieving the stably polymer network structure of the liquid crystal layer, the base portion of the polymer network structure 152 may have more difunctional reactive monomers of the formula (II) than the monofunctional reactive monomers of the formula (I).

According to the above results, the liquid crystal display made using the liquid crystal composition including at least two reactive monomers can makes it possible to provide a lower image-sticking rate, thereby effectively improving the credibility, when compared to a liquid crystal display made using the only one kind of the reactive monomer.

As is understood by a person of ordinary skill in the art, the foregoing embodiments of the present invention are illustrative of the present invention rather than limiting of the present invention. It is intended to cover various modifications and similar arrangements included within the spirit and scope of the appended claims. Therefore, the scope of which should be accorded to the broadest interpretation so as to encompass all such modifications and similar structure.

What is claimed is:

1. A liquid crystal composition for liquid crystal display, comprising:
   a liquid crystal material having a negative dielectric constant anisotropy; and
   at least one reactive monomer,
   wherein an amount of the at least one reactive monomer in the liquid crystal composition ranges from 0.05% to 10% by weight,
   wherein the at least one reactive monomer is selected from those of formula (II):

A1-B1-M1-C1-B2-C2-B3-M2-A2         (II)

wherein A1 and A2 may be the same or different, and A1 and A2 are selected from the group consisting of acrylate, methyl acrylate, vinyl, vinyloxy, and epoxy groups;
   B1 and B3 may be the same or different, and B1 and B3 are selected from the group consisting of 1,4-phenylene, diphenyl, naphthalene-2,6-diyl, and phenoxy groups;
   B2 is selected from substituted or unsubstituted 1,4-phenylene groups;
   C1 and C2 may be the same or different, and C1 and C2 are selected from —COO—, —OCO—, and —O—; and
   M1 and M2 may be the same or different, and M1 and M2 are selected from alkanediyl groups $-(CH_2)_n-$, and in which n is an integer ranging from 0 to 11.

2. The liquid crystal composition for liquid crystal display according to claim 1, further comprising another reactive monomer selected from those of formula (I):

A1-M1-B1-M2-C1-B4         (I)

wherein A1 is selected from the group consisting of acrylate, methyl acrylate, vinyl, vinyloxy, and epoxy groups;
   B1 is selected from the group consisting of 1,4-phenylene, diphenyl, naphthalene-2,6-diyl, and phenoxy groups;
   B4 is selected from a cholesteryl group, phenyl-oxy-alkyl groups, and phenyl-cycloalkyl groups;
   C1 is selected from —COO—, —OCO—, and —O—; and
   M1 and M2 are independently selected from alkanediyl groups $-(CH_2)_n-$, and in which n is an integer ranging from 0 to 11.

3. A liquid crystal display, comprising:
   a first substrate and a second substrate, wherein the first substrate and the second substrate are vertically-aligned;
   a liquid crystal layer intervened between the first substrate and the second substrate, wherein the liquid crystal layer contains liquid crystal molecules that are substantially vertical to a main surface of the first substrate when no electric field is applied to the liquid crystal layer; and
   a polymer polymerized by at least one reactive monomer disposed on the first substrate and the second substrate respectively;
   wherein the at least one reactive monomer is selected from those of formula (II):

A1-B1-M1-C1-B2-C2-B3-M2-A2         (II)

wherein A1 and A2 may be the same or different, and A1 and A2 are selected from the group consisting of acrylate, methyl acrylate, vinyl, vinyloxy, and epoxy groups;
   B1 and B3 may be the same or different, and B1 and B3 are selected from the group consisting of 1,4-phenylene, diphenyl, naphthalene-2,6-diyl, and phenoxy groups;
   B2 is selected from substituted or unsubstituted 1,4-phenylene groups;
   C1 and C2 may be the same or different, and C1 and C2 are selected from —COO—, —OCO—, and —O—; and
   M1 and M2 may be the same or different, and M1 and M2 are selected from alkanediyl groups $-(CH_2)_n-$, and in which n is an integer ranging from 0 to 11.

4. The liquid crystal display according to claim 3, wherein the polymer has an acrylate polymer network structure with cholesteryl, phenyl-oxy-alkyl or phenyl-cycloalkyl side chain.

5. The liquid crystal display according to claim 3, further comprising another reactive monomer selected from those of formula (I):

A1-M1-B1-M2-C1-B4         (I)

wherein A1 is selected from the group consisting of acrylate, methyl acrylate, vinyl, vinyloxy, and epoxy groups;
   B1 is selected from the group consisting of 1,4-phenylene, diphenyl, naphthalene-2,6-diyl, and phenoxy groups;
   B4 is selected from a cholesteryl, phenyl-oxy-alkyl groups, and or phenyl-cycloalkyl groups;
   C1 is selected from —COO—, —OCO—, and —O—; and
   M1 and M2 may be the same or different, and M1 and M2 are selected from alkanediyl groups $-(CH_2)_n-$, and n is an integer ranging from 0 to 11.

6. The liquid crystal display according to claim 3, wherein B2 is selected from groups of formula (III):

(III)

wherein $R_0$ is selected from substituted and unsubstituted alkyl groups having from 1 to 6 carbon atoms, substituted and unsubstituted alkoxy groups having from 1 to 6 carbon atoms, halogen atoms, and alkenyl groups having from 1 to 6 carbon atoms; each of the alkyl and the alkoxy group may be interrupted by an unsaturated bond, an ether bond, a thioether bond and an ester bond.

7. The liquid crystal display according to claim 3, wherein the at least one reactive monomer is selected from those having formulas of PLC-7199, PLC-7238, PLC-7212, PLC7223, and PLC7257:

PLC-7199 wherein R is selected from alkyl-$C_mH_{2m+1}$, n is an integer ranging from 0 to 11, and m is an integer ranging from 0 to 11;

PLC-7238 wherein X is an alkanediyl linking group in which n is an integer ranging from 0 to 11;

PLC-7212 wherein $R_1$ is selected from alkyl-$C_mH_{2m+1}$, n is an integer ranging from 0 to 11, and m is an integer ranging from 0 to 11;

PLC-7223 wherein $R_2$ is selected from alkyl-$C_mH_{2m+1}$, n is an integer ranging from 0 to 11, and m is an integer ranging from 0 to 11; and wherein $R_3$ is selected from alkyl-$C_mH_{2m+1}$, n is an integer ranging from 0 to 11, and m is an integer ranging from 0 to 11.

8. The liquid crystal composition for liquid crystal display according to claim 2, wherein the reactive monomer selected from those of formula (I) is present in an amount less than the reactive monomer selected from those of formula (II).

9. The liquid crystal display according to claim 5, wherein the reactive monomer selected from those of formula (I) is present in an amount less than the reactive monomer selected from those of formula (II).

* * * * *